3,247,239
AVOIDANCE OF RETRO-IONYLIDENE TRANSPO-
SITION BY DEACYLOXYLATION OF COM-
POUNDS OF THE VITAMIN $A_1$, $A_2$, BETA-CARO-
TENE AND CAROTENOID SERIES, WITH A
NUCLEOPHILIC COMPOUND IN AN ANHY-
DROUS MEDIUM
Ernst Truscheit, Leverkusen, and Karl Eiter and Hermann
Oediger, Cologne-Stammheim, and Eberhard Stein and
Hans-Joachim Kabbe, Leverkusen, and Rudolf Lorenz,
Wuppertal-Elberfeld, Germany, assignors to Farben-
fabriken Bayer Aktiengesellschaft, Leverkusen, Ger-
many, a corporation of Germany
No Drawing. Filed Aug. 1, 1961, Ser. No. 128,398
Claims priority, application Germany, Aug. 3, 1960,
F 31,827
9 Claims. (Cl. 260—468)

This invention relates to a new and improved process for the production of compounds of the vitamin $A_1$-, vitamin $A_2$-, beta-carotene- and carotenoid series which are characterized by the presence in the molecule of either a beta-ionylidene structure or a beta-3′,4′-dehydroionyli-dene structure as graphically illustrated below by Formulae I and II respectively:

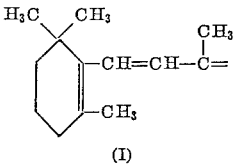     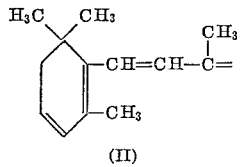

(I)     (II)

More particularly, this invention is directed to an improved process for the production of compounds of the aforementioned series from precursors which contain one or more hydroxyl groups or metallized hydroxyl groups and which have an activated methylene group in the alpha-position to the carbon atom carrying the hydroxyl group or metallized hydroxyl group, said hydroxyl group being in the allyl position relative to the double bond in the 1′-position of the cyclohexene or cyclohexadiene ring or relative to a double bond, which is in conjugation therewith.

In the manufacture of biologically active compounds of the vitamin A series obtained by splitting off of water from compounds containing hydroxyl groups in the allyl position to the double bond in the cyclohexene ring or compounds containing a hydroxyl group in an allyl position by way of a double bond or a system of several conjugated double bonds, there are usually formed products which are not homogeneous and frequently the reaction mixture contains, predominantly, a product where the dehydration is effected with a transposition of the allyl position. These compounds belong to the so-called "retro" or "iso" series and are unsuitable as intermediates for the synthesis of compounds of the vitamin A series in that further processing thereof leads to biologically inactive products (see H. O. Huisman et al., Recueil de traveaux chimiques de Pays-Bas, 71, pages 899–919, and particularly pages 904–907 and 911 (1952)). Thus, for example, when water is split off from the beta-ionol acetic ester (III) under various different conditions, the undesired retro ionylidene acetic ester (IV) is always formed to a predominant degree (see for example H. O. Huisman et al., Recueil de traveaux chimiques de Pays-Bas, 71, 916 (1952); H. O. Huisman et al., Recueil de traveaux chimiques de Pays-Bas, 75, 997–998 (1956)).

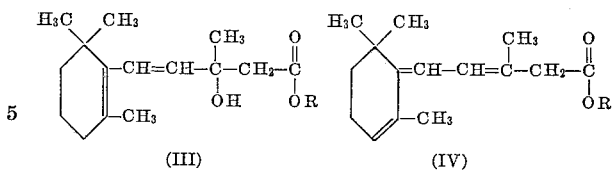

Correspondingly, when water is split off from the so-called "$C_{20}$-hydroxyester" (V) with alcoholic hydrochloric acid, it is almost exclusively the "Retro-$C_{20}$-ester" (VI) (H. O. Huisman et al., Recueil de traveaux chimiques de Pays-Bas, 75, 1003 (1956)) which one obtains.

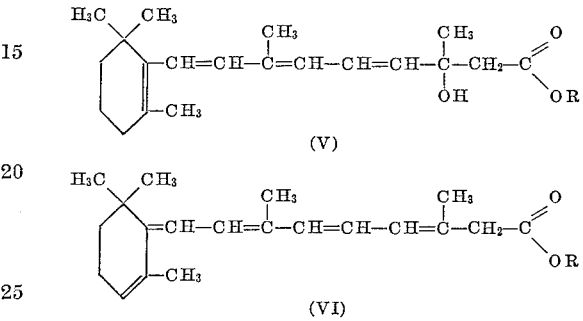

When water is split off from the "$C_{16}$-acetylene-carbinol" (VII), for example, with arsenic-(III)-chloride or phosphorus oxychloride, the undesired "Retro-$C_{16}$-hydrocarbon" (IX) is formed as well as the desired "$C_{16}$-hydrocarbon" (VIII)

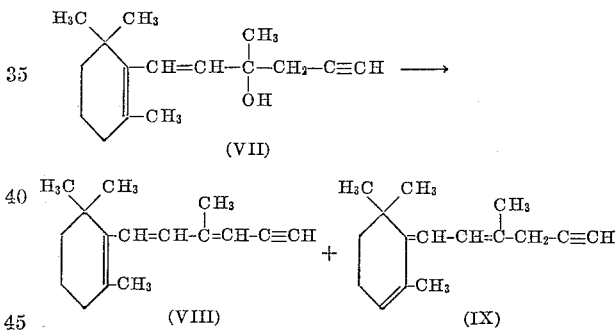

Swiss Patent No. 257,577 claims inter alia a dehydration process by which the 9-(2′,6′,6′-trimethylcyclohex-1′-enyl) - 7 - hydroxy - 3,7 - dimethyl - 1 - methoxynonatri-2,4,8-ene (X) is esterified with an organic acylation agent and thereafter acid is split-off by heating, if necessary in the presence of alkali agents.

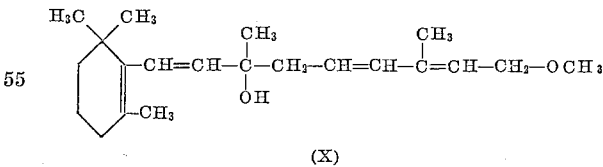

(X)

It is merely disclosed in the Swiss patent that water can be split off from Compound X. Thus, in Example 2 of the patent, the Compound X is heated under reflux with acetic acid anhydride in the presence of sodium acetate. The result is the same as the dehydration with phosphorus tribromide in the presence of pyridine, as also described in Example 1 of this Swiss patent. The retro-ionylidene transposition cannot be avoided, however, either under the conditions of the first-mentioned dehydration method or under the conditions of the last-mentioned dehydration method. It is true that a product is obtained which is "highly effective in the growth test as regards a rat deficient in vitamin A," but it is stated in Chimia, 4 (1950), on pages 116 and 117, where inter alia, the dehydration of X is fully discussed, that the product of any dehydration of X has a strikingly low efficacy is explained by the fact that it is substantially the retro Compound XI which is obtained by the processes of the Swiss patent from Compound X.

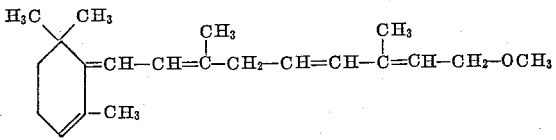

(XI)

Swiss Patent No. 257,577 thus does not show that the Compound X can be dehydrated by treatment with an organic acylation agent and subsequent heating, perhaps in the presence of alkali agents, with avoidance of the retroionylidene transposition.

This invention is based on the discovery that when compounds of the class described above are acylated in the manner hereinafter more fully described and thereafter reacted with nucleophilic compounds in an anhydrous medium in the absence of atmospheric oxygen there are produced compounds which have high biological efficacy and to the substantial or virtual exclusion of compounds of the "retro" or "iso" series.

It is an essential feature of the process according to the invention that compounds which belong to the so-called "Retro series" are not formed at all. In actual fact, there are formed in a smooth reaction and with excellent yields, always compounds with a beta-ionylidene or beta-3′,4′-dehydroionylidene structure (I and II, respectively) the double bonds of which are arranged and conjugated in the manner which is also the case with vitamin $A_1$, $A_2$ or beta-carotene.

Serving as starting materials for the process according to the invention are compounds containing hydroxyl groups or metallized hydroxyl groups and of the vitamin $A_1$, vitamin $A_2$, beta-carotene and carotinoid series, the hydroxyl groups of which are in the allyl position, or are brought by way of a double bond or a system of conjugated double bonds into the allyl position, relatively to that double bond in the 1′-position of the cyclohexene or cyclohexadiene ring. Instead of carrying the hydroxyl groups, however, these starting products can also carry metallized hydroxyl groups, such as —OLi, —ONa, —OK, —OMg$_2$, —OZn$_2$, —OCd$_2$, —OAl$_3$. The carbon atom on which the free or metallized hydroxyl group is disposed has an activated methylene group in the alpha-position. The activation of this methylene group can be effected by a carbon-carbon double or triple bond, a carbon-nitrogen double or triple bond or by a carbon-oxygen double bond.

The starting materials for the process according to the invention can be represented by the general formula:

$$R-(CH=CH)_m-\underset{R'}{\overset{|}{C}}=CH)_n-(CH=CH)_p-(C\equiv C)_r-(\underset{R''}{\overset{|}{C}}=CH)_s-\underset{R'''}{\overset{|}{C}}-CH_2-C\underset{OR^{IV}}{\overset{\equiv}{|}}$$

(XIII)

in which R stands for the 2′, 6′, 6′-trimethylcyclohex-1′-enyl (XIII) or the 2′, 6′, 6′-trimethylcyclohexadi-1′,3′-enyl radical (XIV) (these radicals can also carry functional groups; for example, the radical XIII can comprise in the 3′ and/or 4′ position an oxo group or a free, etherified or esterified hydroxyl group), R′, R″, R‴ stand for hydrogen or the methyl group and R$^{IV}$ stands for hydrogen or 1 equivalent of a metal, for example, lithium, sodium, potassium, magnesium, zinc, cadmium or aluminum.

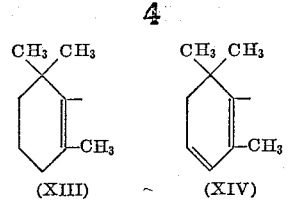

(XIII)  (XIV)

The letters m, n, p, r and s represent 0 or 1.

Representative of the types and classes of compounds of the general Formula XII which can be employed as starting materials in accordance with the invention include for example:

(XV) 5 - (2′,6′,6′-trimethylcyclohex - 1′ - enyl) - 3 - methyl-3-hydroxypenten-4-acid-1-methyl ester (beta-ionol-acetic acid methyl ester)

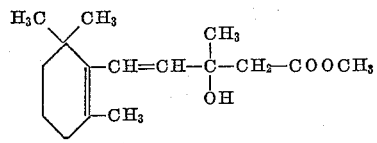

(XVI) 6-(2′,6′,6′-trimethylcyclohex-1′-enyl)-4-methyl-4-hydroxyhex-5-en-1-yn

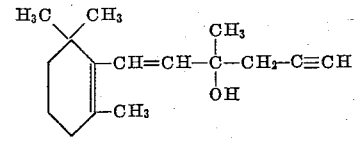

(XVII) 5 - (2′,6′,6′ - trimethylcyclohex - 1′-enyl)-3-methyl-3-hydroxypent-4-enic acid nitrile

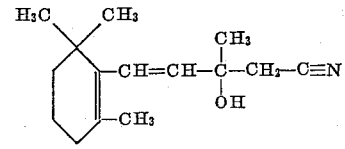

(XVIII) the dialkyl acetal of 9-(2′,6′,6′-trimethylcyclohex-1′-enyl) - 3,7 - dimethyl - 3,7 - dihydroxynon-8-en-4-yn-1-al

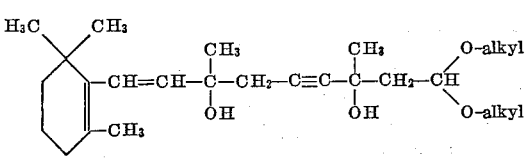

(XIX) 9 - (2′,6′,6′ - trimethylcyclohex - 1′ - enyl) - 3,7-dimethyl - 5 - hydroxynonatri - 2,6,8 - enic acid methyl ester

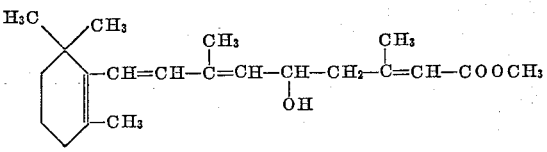

(XX) 9-(2′,6′,6′-trimethylcyclohex-1′-enyl)-3,7-dimethylnonatri-2,6,8-en-1-1,5-diol

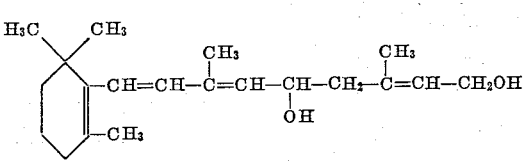

(XXI) 9 - (2′,6′,6′ - trimethylcyclohexadi - 1′,3′ - enyl)-3,7 - dimethyl - 5 - hydroxynonatri - 2,6,8 - enic acid methyl ester

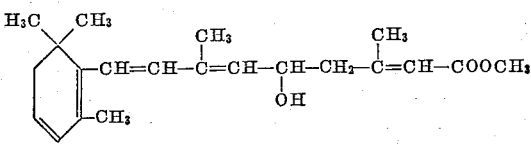

(XXII) 9,10,13,14,9',10',13',14' - octahydro - 11,12,11',12'-bis - dihydro - 9,13,9',13' - tetrahydroxy - beta-carotene

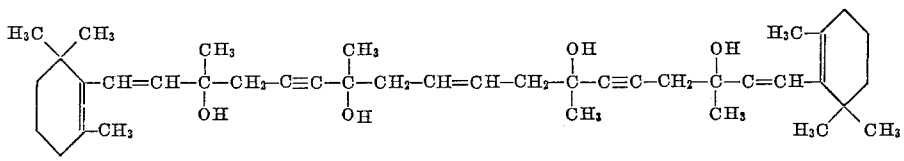

(XXIII) 13,14,13',14'-tetrahydro-13,13'-di-hydroxy-beta-carotene

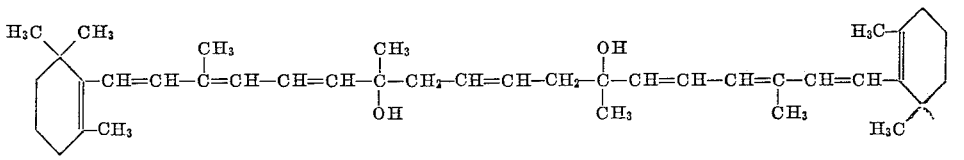

The starting materials suitable for the process according to the invention can be readily prepared, for example, by organometallic reactions of aldehydes or ketones of the vitamin $A_1$, vitamin $A_2$, beta-carotene or carotenoid series with halogen compounds and subsequent decomposition of the reaction products with acidly reacting aqueous electrolyte solutions. For example, by reacting beta-ionone with methylbromacetate and zinc in ether and tetrahydrofuran, the methyl beta-ionolacetate (XV) is obtained. Furthermore, from beta-ionone, propargylbromide and aluminum in tetrahydrofuran, the 6-(2',6',6' - trimethylcyclohex-1'-enyl)-4-methyl-4-hydroxyhex-5-en-1-yn (XVI) is obtained. According to United States patent application Serial No. 738,275, filed March 28, 1958, now Patent No. 3,021,355, beta-ionone can be reacted with bromacetonitrile and zinc to form beta-ionolacetonitrile (XVII). By means of a Grignard reaction, the dihydroxyacetal (XVIII) can be prepared from the acetylene carbinol (XVI) and a 1,1-dialkoxybutan-3-one in accordance with German specification 1,028,118. Furthermore, by means of a Reformatsky reaction of beta-ionylidene acetaldehyde with gamma-bromo-beta-methyl-crotonic acid methylester and zinc, in addition to the delta-lactone of 9-(2',6',6'-trimethylcyclohex-1'-enyl)-3,7-dimethyl-5-hydroxynonatri-2,6,8-enic-1-acid, there is obtained the 9-(2',6',6'-trimethylcyclohex-1'-enyl)-3,7-dimethyl-5-hydroxynonatri-2,6,8-enic-1-acid methylester (XIX). The mixture of these two compounds can be reduced with a complex metal hydride to the $C_{20}$ diol (XX). Likewise, by means of a Reformatsky reaction, the hydroxy ester (XXI) can be prepared from beta-3',4'-dehydroionylideneacetaldehyde with gamma-bromo-beta-methyl crotonic acid methylester and zinc. The initial beta-carotene product (XXII) can be obtained by organometallic reaction of octen-4-di-2,7-one with the $C_{16}$ acetylene carbinol (XVI) as shown in German Patent 818942, while the compound (XXIII) can be prepared by organometallic reaction of octen-4-di-2,7-one with the $C_{16}$-hydrocarbon (VIII) and subsequent partial hydrogenation of the two triple bonds (British patent specification No. 915,037, filed March 1, 1961).

Starting materials which are also suitable for the process according to the invention are compounds of the general Formula XII, in which $R^{IV}$ stands for 1 equivalent of a metal, such as for example lithium, sodium, potassium, magnesium, zinc, cadminum or aluminum. Such compounds are for example formed as final products with the aforementioned organometallic syntheses of the substances XV to XXIII, if the decomposition with acidly reacting aqueous electrolyte solutions is not used. They do not have to be isolated in substance, but can be acylated at temperatures from −20 to +100° C. in the first stage of the process according to the invention in the presence of the inert solvent used for their production, such as ether, tetrahydrofuran, or benzene, in a manner known per se with an organic acid halide, such as acetyl chloride, propionyl chloride, benzoyl chloride, methane sulphochloride, p-toluene sulphochloride in an inert solvent, such as ether, tetrahydrofuran, n-hexane, n-heptane, benzene or toluene, if required in the presence of a tertiary base such as triethylamine, pyridine or quinoline.

Instead of the acid halides, it is also possible to use other organic acylation agents, such as simple and mixed carboxylic acid anhydrides, such as acetic acid anhydride, propionic acid anhydride or the mixed anhydride of formic acid and acetic acid. For example, there is obtained from beta-ionone, propargyl bromide and aluminum in tetrahydrofuran an organic aluminum compound which can for example be transformed with propionic acid anhydride directly into the propionate (XXIV) of 6-(2',6',6' - trimethylcyclohex-1'-enyl)-4-methyl-4-hydroxyhex-5-en-1-yn.

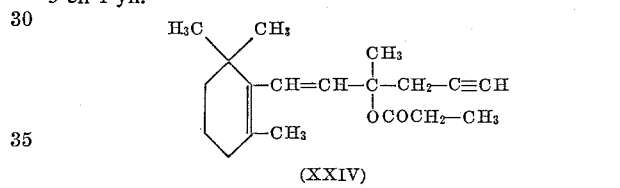

(XXIV)

The acylation of the starting products for the process according to the invention, when they have a free hydroxyl group (general Formula XII, $R^{IV}$=H) is likewise effected in the aforementioned manner using the same solvents and reaction conditions.

For example, the $C_{16}$-acetylene carbinol (XVI) can be reacted with acetylchloride in pyridine and benzene at about 70° to an acetate corresponding to the propionate XXIV. The hydroxy ester (XIX) is preferably transformed under gentle conditions at temperatures between 0 and 20° with acetyl chloride in ether and in the presence of pyridine into the acetoxy Compound XXV.

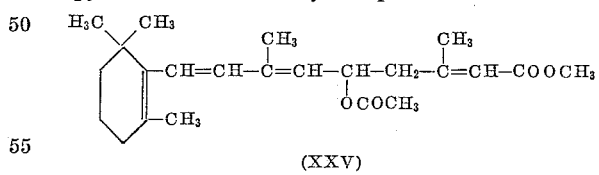

(XXV)

Under the same conditions, the corresponding $C_{20}$-diacetate (XXVI) is obtained from the $C_{20}$-diol XX.

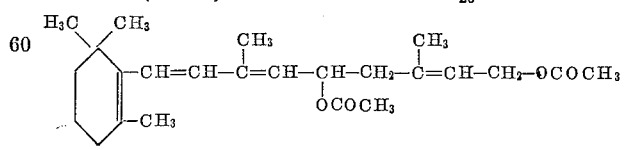

(XXVI)

Similarly, with acetylchloride in benzene and in the presence of pyridine, the $C_{40}$-diol (XXIII) can be transformed into the corresponding diacetate.

In the second stage of the process according to the invention, the acyl derivatives prepared as described above and having the general Formula XII ($R^{IV}$=acyl) are reacted with nucleophilic compounds in anhydrous medium in an inert atmosphere.

Suitable nucleophilic compounds are for example alkali or alkaline earth metal alcoholates, such as lithium, sodium, potassium, magnesium, calcium, methylate, ethylate, isopropylate, isobutylate, tert.-butylate, benzylate or alkali metal or alkaline earth metal amides such as lithium, sodium, potassium, magnesium, calcium amides; one or even both of the hydrogen atoms in these amides can be substituted by aliphatic and/or aromatic radicals.

The reaction is carried out in the absence of atmospheric oxygen, if necessary with the use of anti-oxidants, such as hydroquinone, phenthiazine or alpha-tocopherolacetate, with 1 to 2.5 mols of the nucleophilic compound (per mol of the double bond to be formed) at temperatures from —30 to +100° and advantageously at about 0 to 60°. The presence of water (atmospheric humidity) and of compounds containing hydroxyl ions, such as alkali or alkaline earth metal hydroxides, is to be avoided. The reaction is preferably carried out in the presence of an absolute organic solvent and suitable for this purpose are for example diethylether, tetrahydrofuran, dioxane, triethylamine, N,N-dimethylaniline, pyridine, petroleum ether (B.P. 30–100°), n-hexane, cyclohexane, benzene, toluene, and in addition lower aliphatic alcohols such as methanol, ethanol, 1-propanol, 2-propanol, 1-butanol, 2-butanol, tert.-butanol, pentanol, diethylamine, aniline, N-methyl-aniline as well as mixtures of these solvents. Anhydrous liquid ammonia is also suitable as solvent, especially when using the said amides as nucleophilic compounds.

After the reaction is complete, the reaction mixture is preferably treated with iced water, the organic fractions are extracted, for example with ether, benzene petroleum ether (B.P. 30–50°) or methylene chloride and the extracts are treated, if necessary, with a dilute mineral acid removing basic fractions. Where functional derivatives of the vitamins $A_1$ and $A_2$, such as the acetates or the alkyl esters of the vitamin $A_1$ or $A_2$ acid, have been prepared in the said reactions, these can be transformed in the last stage in the process according to the invention, for example by alkali saponification or reduction with a complex metal hydride, such as lithium aluminum hydride into the corresponding vitamins.

For example, the beta-ionylidene methyl acetate (XXVII) is obtained from the acetate of beta-ionolmethylacetate (XV) and sodium tert.-butylate in absolute tetrahydrofuran.

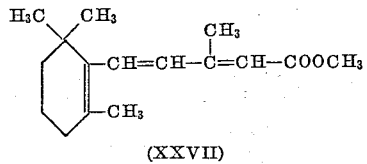

(XXVII)

This can also be prepared in a single stage from beta-ionol methylacetate (XV) by reacting the latter with acetyl chloride in ether and in the presence of pyridine with absence of moisture at 0° and treating the reaction mixture with a solution of sodium tert.-butylate in absolute tetrahydrofuran. Furthermore, the 6-(2′,6′,6′-trimethylcyclohex-1′-enyl)-4-methylhexadi-3,5-en-1-yn ($C_{16}$-hydrocarbon (VIII)) is for example obtained from the propionate (XXIV) of $C_{16}$-acetylene carbinol with sodium-N-methylanilide in pyridine. The compound is free from the Retro isomer (IX), as is clearly apparent from the infrared absorption spectrum, which shows a sharp absorption characteristic of the alpha,beta-unsaturated C≡C-bond. The same product is also obtained from the acetate of (XIV) with potassium tert.-butylate in absolute tetrahydrofuran at 40–50° C. The product (VIII) is an important intermediate product for the synthesis of vitamin A and beta-carotene.

With sodium tert.-butylate in absolute tetrahydrofuran, the acetate (XXV) can be transformed into the methylester of vitamin $A_1$ acid, which can in known manner be reduced with lithium-aluminum hydride to vitamin $A_1$. From the diacetate (XXVI), there is, for example, obtained the vitamin $A_1$ acetate with potassium tert.-butylate in absolute ether-pyridine mixture, it being possible for the said acetate to be saponified with alcoholic sodium hydroxide solution to the vitamin $A_1$. In the same manner as with compound (XXV), the acetate of (XXI) can be transformed with sodium tert.-butylate in absolute tetrahydrofuran at 0° into the methylester of vitamin $A_2$ acid, from which the vitamin $A_2$ can be prepared by reduction with lithium-aluminum hydride. The beta-carotene is obtained from the diacetate of XXIII with potassium tert.-butylate in absolute pyridine.

*Example 1.—Preparation of 6-(2′,6′,6′-trimethylcyclohex-1′-enyl)-4-methylhexadi-3,5-en-1-yn ($C_{16}$-hydrocarbon-VIII)*

48 parts by weight of acetyl chloride, dissolved in 50 parts by volume of absolute benzene, are run into a mixture of 110 parts by weight of absolute pyridine and 100 parts by volume of absolute benzene while stirring and in a nitrogen atmosphere at 0°. The solution of 40 parts by weight of 6-(2′,6′,6′-trimethylcyclohex-1′-enyl)-4-methyl-4-hydroxy-hex-5-ene-1-yn (XVI) in 50 parts by volume of absolute benzene is then added and the reaction mixture is thereafter allowed gradually to assume room temperature. After stirring for about 1 hour at room temperature, it is heated for about 3 hours with continued stirring to 70–75° and finally cooled to 0° After stirring for about 1 hour at room temperature, it is heated for about 3 hours with continued stirring to 70–75° and finally cooled to 0°. After adding iced water, the organic fractions are extracted by shaking with ether. The combined ether extracts are successively washed with dilute sulphuric acid, water, sodium-hydrogen carbonate solution and water and dried over sodium sulphate. After evaporating the solvent at reduced pressure, there are obtained 44 parts by weight (93% of the theoretical) of 6-(2′,6′,6′-trimethylcyclohex-1′-enyl)-4-methyl-4-acetoxy-hex-5-en-1-yn with the boiling point B.P.$_{0.001}$ 90–100° (air bath temperature; $n_D^{20}$:1.4956; $\lambda_{max}$ 235mμ ($\epsilon$=5600). The infra-red absorption spectrum shows characteristic absorptions at 3280 cm.$^{-1}$ (—C≡CH group), 2110 cm.$^{-1}$ (alpha,beta-saturated —C≡C-bond), 1740 cm.$^{-1}$ (ester carbonyl), 969 cm.$^{-1}$ (symmetrically disubstituted

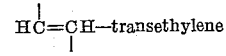

bond).

Analysis $C_{18}H_{26}O_2$ (mol weight 274.41).—Calculated: C=78.78%, H=9.55%, O=11.67%. Found: C=78.80%, H=9.69%, O=11.66%.

To the solution of 274.4 parts by weight of 6-(2′,6′,6′-trimethylcyclohex - 1′ - enyl) - 4 - methyl - 4 - acetoxy-hex-5-en-1-yn in 1000 parts by volume of absolute tetrahydrofuran, there is added while stirring and in a nitrogen atmosphere at 0° the solution of 130 parts by weight of potassium tert.-butylate (99.6%) in 1500 parts by volume of absolute tetrahydrofuran. The reaction mixture is stirred for 30 minutes at 0°, 30 minutes at 20° and finally for 1 hour at 50°. The tetrahydrofuran is then, for the major part, distilled off under reduced pressure and iced water is added to the residue. The organic fractions are extracted by shaking with ether and the combined ether extracts are washed with water and dried over sodium sulphate. After evaporating the solvent under reduced pressure, there remain 204 parts by weight (95% of the theoretical) of 6-(2′,6′,6′-trimethylcyclohex-1′-enyl)-4-methylhexadi-3,5-en-1-yn with the B.P. $_{0.001}$ mm. Hg 70–85° (air bath temperature); $n_D^{20}$: 1.5610; λ $_{max.}$ 283mμ ($\epsilon$=19,400). In the infra-red absorption spectrum, there are found characteristic bands at 3280 cm.$^{-1}$ (—C≡CH group), 2080 cm.$^{-1}$ (alpha,beta-unsaturated —C≡C-bonds)

967 cm.$^{-1}$ (symmetrically disubstituted

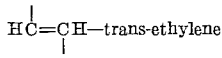

bond). The absorption at 2110 cm.$^{-1}$ (alpha,beta-saturated —C≡C-bond), which is characteristic for the retro-C$_{16}$-hydrocarbon IX, is completely absent in this case. Consequently, it is not possible, even with low-cooling of the petroleum ether solution of the reaction product, to crystallize out any retro fraction.

Analysis C$_{16}$H$_{22}$ (mol weight 214.36).—Calculated: C=89.65%, H=10.35%. Found: C=89.51%, H=10.34%.

*Example 2.—Preparation of 6-(2',6',6'-trimethylcyclohex-1'-enyl)-4-methylhexadi-3,5-en-1-yn. (C$_{16}$-hydrocarbon VIII)*

To a suspension of 2.2 parts by weight of aluminum flakes in 20 parts by volume of absolute tetrahydrofuran, and after adding 0.05 part by weight of mercuric chloride there is run in a soultion of 14.2 parts by weight of propargylbromide in 14 parts by volume of absolute tetrahydrofuran in a nitrogen atmosphere at 25–30° C. while stirring. The reaction mixture is stirred for another hour at 25–30° C., diluted with 20 parts by volume of absolute tetrahydrofuran, then cooled to about −30° C. and then a solution of 16 parts by weight of beta-ionone in 30 parts by volume of absolute tetrahydrofuran is added at −30° C. while stirring. After stirring, the mixture is kept in a refrigeration bath at −30° C. for another 2 hours, 50 parts by weight of propionic acid anhydride are added to the reaction mixture at about −30° C. with stirring. The refrigeration bath is then removed and the reaction mixture is stirred for another 14 hours at 20° C. and for 1 hour at +35° C. After cooling to 0° C., the mixture is allowed to flow into 750 parts by weight of iced water, to which 100 parts by weight of sodium-hydrogen carbonate have been added. For decomposing any excess anhydride, the mixture, thus obtained, is stirred for about 1½ hours with a high-speed stirrer, the temperature not being allowed to exceed 20° C. The mixture, thus obtained, is shaken several times with ether and the combined ether extracts are washed with water and dried over sodium sulphate. After evaporating the ether under reduced pressure, there remain 32.5 parts by weight of a yellow liquid, from which 12 parts by weight of low-boiling secondary products are separated out in an air bath up to a maximum temperature of 70° C. under high vacuum (0.001 mm. Hg). In the distillation vessel, there remain 19 parts by weight of a liquid with the refractive index $n_D^{20}$=1.5009. The compound is the propionate (XXIV) of C$_{16}$-acetylene carbinol.

Analysis C$_{19}$H$_{28}$O$_2$ (mol weight 288.23).—Calculated: C 79.10, H 9.78, O 11.12. Found: C 78.88, H 9.68, O 11.18.

The characteristic bands in the infra-red absorption spectrum are at 3280 cm.$^{-1}$ (—C≡CH), 2110 cm.$^{-1}$ (alpha,beta-saturated —C≡C-bond), 1740 cm.$^{-1}$ (estercarbonyl) and 969 cm.$^{-1}$ (symmetrically disubstituted

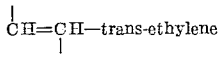

bond).

A solution of 4.2 parts by weight of 6-(2',6',6'-trimethylcyclohex - 1' - enyl) - 4 - methyl - 4 - propionoxyhex-5-en-1-yn in 10 parts by weight of absolute pyridine are added with stirring to a solution of 2 parts by weight of potassium tert.-butylate (99.8%) in 20 parts by weight of absolute pyridine at 0 to −5° C. in the presence of nitrogen. The reaction mixture is further stirred for 1 hour at 0° C. and for 1 hour at 40–45° C. and, after cooling to 0° C., it is incorporated by stirring into a mixture of 25 parts by weight of concentrated sulphuric acid and 250 parts by weight of ice. After being extracted several times by shaking with ether, the collected ether extracts are successively washed with iced water, ice-cold sodium-hydrogen carbonate solution and iced water and finally they are dried over sodium sulphate. After evaporating the solvent, there remain 2.6 parts by weight of a deep orange-yellow liquid of $n_D^{20}$=1.5640.

The compound is the 6-(2',6',6'-trimethylcyclohex-1'-enyl)-4-methylhexadi-3,5-en-1-yn with the B.P. $_{0.001\ mm.\ Hg}$ 70–80° C. (air bath temperature). The characteristic bands in the infra-red absorption spectrum are at 3280 cm.$^{-1}$ (—C≡CH group, 2080 cm.$^{-1}$ (alpha,beta-unsaturated —C≡CH-bond) and 969 cm.$^{-1}$ (symmetrically disubstituted

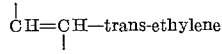

bond). The band at 2110 cm.$^{-1}$ (alpha,beta-saturated —C≡CH-bond) associated with the retro-C$_{16}$-hydrocarbond is not present. Consequently even with low cooling of the petroleum ether solution of the hydrocarbon, no retro fractions can be precipitated.

*Example 3.—Preparation of 6(2',6',6'-trimethylcyclohex-1'-enyl)-4-methylhexadi-3,5-en-1-yn*

The solution of 27 parts by weight of 6-(2',6',6'-trimethylcyclohex - 1' - enyl) - 4 - methyl - 4 - acetoxyhex-5-en-1-yn in 100 parts by volume of absolute ether are added with stirring and in approximately 20 minutes to 6 parts by weight of freshly prepared potassium amide, dissolved or suspending in about 200 parts by weight of liquid ammonia, the addition taking place at −60° C. After stirring the mixture for 9 hours at −27° C., the ammonia is allowed to evaporate without external cooling and the mixture is stirred for another 12 hours at 0° after adding another 150 parts by volume of absolute ether. The reaction mixture is poured on to ice, the ether layer is separated and the aqueous phase is again extracted by shaking with ether. The combined ether extracts are successively washed with ice-cold 10% sulphuric acid, iced water, sodium-hydrogen carbonate solution and iced water and finally dried over sodium sulphate. After evaporating the solvent, 18 parts by weight of a yellow liquid are obtained.

The infra-red absorption spectrum taken from this oil shows that it is substantially a mixture of 6-(2',6',6'-trimethylcyclohex - 1'-enyl)-4-methylhexadi-3,5-en-1-yn and some unmodified starting material.

*Example 4.—Preparation of 6-(2',6,'6'-trimethylcyclohex-1'-enyl)-4-methylhexadi-3,5-en-1-yn*

To 2.95 parts by weight of metallic sodium are introduced in a nitrogen atmosphere into 21 parts by weight of freshly distilled aniline after adding 0.01 part by weight of nickel oxide. The mixture thus obtained is heated to boiling under reflux until the metal dissolves. After cooling the reaction mixture to about 100° C., 34.6 parts by weight of absolute pyridine are added for dilution purposes.

To 19 parts by weight of the sodium anilide solution thus prepared and in a nitrogen atmosphere, and after adding another 50 parts by weight of absolute pyridine, the solution of 9.25 parts by weight of 6-(2',6',6'-trimethylcyclohex-1'-enyl)-4-methyl-4-acetoxyhex-5-en-1-yn in 10 parts by weight of absolute pyridine is added while stirring at −10° C. in about 5 minutes. The reaction mixture is thereafter stirred for 1 hour at 35° and 30 minutes at 45° and finally decomposed with iced water. After extracting the organic fraction by shaking with petroleum ether, the petroleum ether phase is successively washed with ice-cold 10% sulphuric acid and then several times with iced water, sodium hydrogen carbonate solution and water and dried over sodium sulphate. After evaporating the petroleum ether under reduced pressure, there are obtained 7 parts by weight of an orange-yellow liquid, which according to the infra-red absorption spectrum consists of a mixture of 6 - (2',6',6'-trimethylcyclohex - 1'-enyl)-4- methylhexadi-3,5-en-1-yn and some unmodified starting material. According to the infra-red absorption spectrum, the $C_{16}$-hydrocarbon present in the mixture is free from the so-called retro-$C_{16}$-hydrocarbon; the band at 2110 cm.$^{-1}$ (alpha,beta-saturated —C≡C—) is not present.

*Example 5.—Preparation of 5-(2',6',6'-trimethylcyclohex-1'-enyl)-3-methyl-pentadi - 2,4-enic acid-1-methylester (beta-ionylidene methyl acetate (XXVII))*

The solution of 12 parts by weight of acetyl chloride in 100 parts by volume of absolute ether is gradually run into a solution of 15 parts by weight of absolute pyridine in 150 parts by volume of absolute ether while stirring in a nitrogen atmosphere at 0° C. Thereafter, at 0° C., the solution of 27 parts by weight of 5-(2',6',6'-trimethylcyclohex - 1'-enyl)-3-hydroxy - 3-methylpent-4-enic acid-1-methylester (beta-ionol methyl acetate (XV), prepared by Reformatsky synthesis from beta-ionone, methyl bromacetate and powdered zinc in ether) in 100 parts by volume of absolute ether is incorporated while stirring. After stirring for 5–15 hours at 0° C., the solution of 24 parts by weight of sublimed sodium tert.-butylate in 100 parts by volume of absolute tetrahydrofuran is added in about 1–2 hours at —30 to —60° C. while stirring vigorously. The reaction mixture is then stirred for approximately 2 more hours at —30 to —60° C. and is then gradually allowed to assume a temperature of 0° C. and finally it is poured on to ice. The organic fractions are extracted with ether, the combined ether extracts are shaken with ice-cold 10% sulphuric acid, water and sodium-hydrogen carbonate solution and dried over sodium sulphate. After evaporating the solvent under reduced pressure, there remain about 25 parts by weight of 5-(2',6',6'-trimethylcyclohex-1'-enyl)-3-methyl-pentadi-2,4-enic acid-1-methylester of $n_D^{20}$: 1.5385.

By high vacuum distillation, there are obtained therefrom approximately 22 parts by weight (87.5% of the theoretical) of beta-ionylidene methyl acetate of B.P.$_{0.001\ mm.\ Hg}$ 115–120° C., $n_D^{20}$: 1.5443, $\lambda_{max}$ 258, 305 mμ ($\epsilon$=12,000, 14,500).

The infra-red absorption spectrum shows the absorption at 1710 cm.$^{-1}$ characteristic of the alpha,beta-unsaturated ester carbonyl, the absorption at 1605 cm.$^{-1}$ which is characteristic of the double bonds in conjugation with the ester carbonyl, and also the absorption at 968 cm.$^{-1}$ which is characteristic of the symmetrically disubstituted

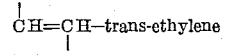

bond.

Analysis $C_{16}H_{24}O_2$ (mol weight 248.37).—Calculated: C=77.37%, H=9.74%. Found: C=77.24%, 77.54%, H=9.96%, 9.98%.

For the saponification, 20 parts of the beta-ionylidene methyl acetate thus obtained is heated to boiling under reflux for 1½ hours in a nitrogen atmosphere with 22 parts by weight of potassium hydroxide, 23 parts by volume of water and 200 parts by volume of ethanol. Thereafter, the ethanol is substantially evaporated under reduced pressure, the residue is taken up in water and the solution thus obtained is acidified at 0° with 10% phosphoric acid. The precipitate thus formed is extracted with ether and the ether extracts, after washing with water, are dried over sodium sulphate. After evaporating the solvent under reduced pressure, there are obtained 18 parts by weight of beta-ionylidene acetic acid (about 95% of the theoretical). After recrystallization from a mixture of ether and petroleum ether (B.P. 30–50°), there are obtained therefrom 10.5 parts by weight of 2-trans-beta-ionylidene acetic acid with the melting point 125–127° C. (identical with a product prepared according to J. Am. Chem. Soc., 77 (1955), page 4117). The evaporating residue of the mother liquor consists of a mixture of 2-trans- and 2-cis-beta-ionylidene acetic acid.

*Example 6.—Preparation of 5-(2',6',6'-trimethylcyclohex-1'-enyl)-3-methylpentadi - 2,4-enic acid-1-methylester [beta-ionylidene methyl acetate (XXVII)]*

Under the conditions described in Example 5, the following are reacted:

12 parts by weight of absolute pyridine +120 parts by volume of absolute ether,
18 parts by weight of benzoyl chloride +100 parts by volume of absolute ether,
27 parts by weight of beta-ionol methyl acetate +100 parts by volume of absolute ether, 26.5 parts by weight of sublimed potassium tert.-butylate +100 parts by volume of absolute tetrahydrofuran.

After high vacuum distillation of the crude product, there are obtained approximately 21.5 parts by weight (about 85.5% of the theoretical) of beta-ionylidene methyl acetate with the B.P.$_{0.001\ mm.\ Hg}$ 115–120° C., $n_D^{20}$:1.5433, $\lambda_{max}$ 258, 305 mμ ($\epsilon$=11,500, 13,800).

The infra-red absorption spectrum is identical with that of the beta-ionylidene methyl acetate described in Example 5.

Analysis $C_{16}H_{24}O_2$ (mol weight 248.37).—Calculated: C=77.37%, H=9.74%. Found: C=77.06%, H=10.00%.

Having thus described the subject matter of the invention, what it is desired to secure by Letters Patent is:

1. A process which comprises reacting an acylate of a compound selected from the group consisting of:

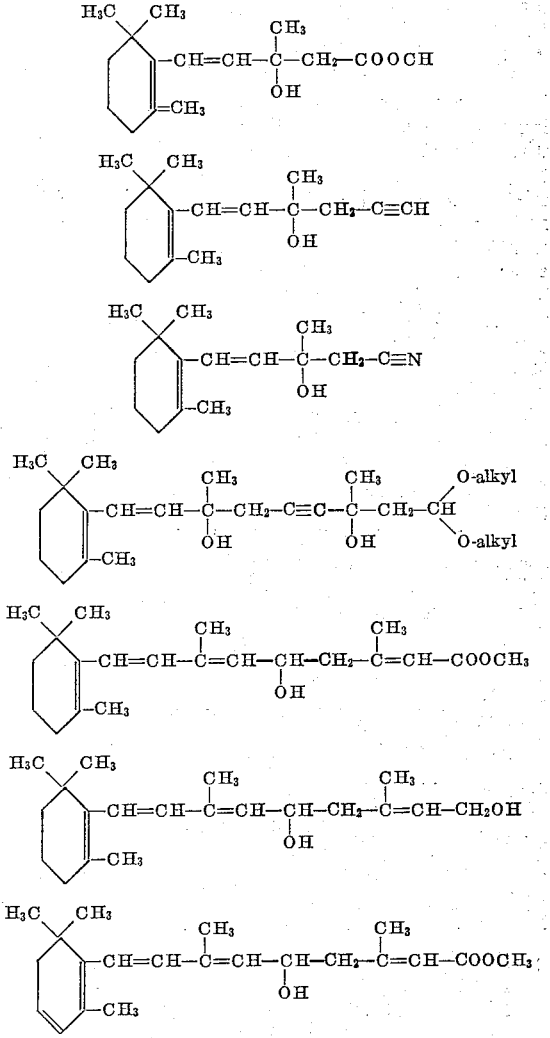

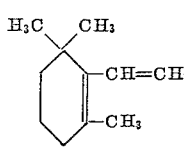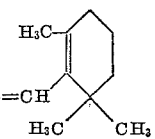

-CH=CH-C(CH₃)(OH)-CH₂-C≡C-C(CH₃)(OH)-CH₂-CH=CH-CH₂-C(CH₃)(OH)-C≡C-CH₂-C(CH₃)(OH)-C=CH-

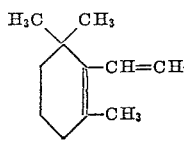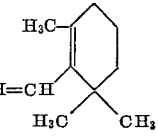

-CH=CH-C(CH₃)=CH-CH=CH-C(CH₃)(OH)-CH₂-CH=CH-CH₂-C(CH₃)(OH)-CH=CH-CH=C(CH₃)-CH=CHwherein the acyl group is selected from the group consisting of acetyl, propionyl, benzoyl, methane sulfonyl and para-toluene sulfonyl, in an anhydrous medium with a nucleophilic compound selected from the group consisting on an alkali metal alcoholate, an alkaline earth metal alcoholate, an alkali metal amide and an alkaline earth metal amide, at a temperature of from about —60° C. to about 100° C.

2. Process as claimed in claim 1 wherein the anhydrous medium is a member selected from the group, consisting of diethylether, tetrahydrofuran, dioxane, triethylamine, N,N-dimethylaniline, pyridine, petroleum ether, n-hexane, cyclohexane, benzene, toluene, a lower alkanol, diethylamine, N-methyl-aniline and mixtures thereof.

3. Process as claimed in claim 1 wherein the nucleophilic compound employed is present in a ratio of 1 mol to 2.5 mols per mol of double bond to be formed.

4. Process as claimed in claim 1 wherein the temperature range at which the acyl derivative is reacted with the nucleophilic compound is a temperature of from 0° C. to 60° C.

5. The method of producing 6-(2',6',6'-trimethylcyclohex-1'-enyl)-4-methyl-hexadi-3,5-en-1-yn which comprises reacting in an inert atmosphere under anhydrous conditions 6-(2',6',6'-trimethylcyclohex-1'-enyl)-4-methyl-4-acetoxy-hex-5-en-1-yn and potassium tertiary-butylate at a temperature of from 0° C. to 50° C.

6. The method of producing 6-(2',6',6'-trimethylcyclohex-1'-enyl)-4-methyl-hexadi-3,5-en-1-yn which comprises reacting in an inert atmosphere under anhydrous conditions 6-(2',6',6'-trimethylcyclohex-1'-enyl)-4-methyl-4-propionoxy-hex-5-en-1-yn and potassium tertiary-butylate at a temperature of from —5° C. to 45° C.

7. The method of producing 6-(2',6',6'-trimethylcyclohex-1'-enyl)-4-methylhexadi-3,5,-en-1-yn which comprises reacting in an inert atmosphere under anhydrous conditions 6-(2',6',6' - trimethylcyclohex - 1'-enyl)-4-methyl-4-acetoxy-hex-5-en-1-yn and potassium amide at a temperature of from —60° C. to 0° C.

8. The method of producing 6-(2',6',6'-trimethylcyclohex-1'-enyl)-4-methylhexadi-3,5,-en-1-yn which comprises reacting in an inert atmosphere under anhydrous conditions 6-(2',6',6' - trimethylcyclohex - 1'-enyl)-4-methyl-4-acetoxy-hex-5-en-1-yn with sodium phenylamide and pyridine at a temperature of from —10° to 45° C.

9. The method of preparing 5-(2',6',6'-trimethylcyclohex-1'-enyl)-3-methylpentadi-2,4-enic acid-1-methyl ester which comprises reacting in an inert atmosphere under anhydrous conditions 5-(2',6',6'-trimethylcyclohex-1'-enyl) - 3-acetoxy-3-methylpent-4-enic-acid-1-methyl ester and sodium tertiary-butylate at a temperature from —60° C. to 0° C.

References Cited by the Examiner

UNITED STATES PATENTS

| | | | |
|---|---|---|---|
| 2,369,158 | 2/1945 | Milas | 260—468 |
| 2,576,104 | 11/1951 | Shantz et al. | 260—468 |
| 2,849,495 | 8/1958 | Isler et al. | 260—666 |
| 2,917,539 | 12/1959 | Isler et al. | 260—666 |

FOREIGN PATENTS

| | | |
|---|---|---|
| 1,068,705 | 11/1959 | Germany. |
| 782,354 | 12/1953 | Great Britain. |

LORRAINE A. WEINBERGER, *Primary Examiner.*

IRVING MARCUS, DUVAL McCUTCHEN,
*Examiners.*